United States Patent [19]

Miller et al.

[11] 4,194,068

[45] Mar. 18, 1980

[54] FLAME RETARDANT COMPOSITION FOR POLYURETHANE COMPRISING BROMOHYDRIN OF PENTAERYTHRITOL AND AN ORGANOPHOSPHORUS COMPOUND

[75] Inventors: Dennis P. Miller, Midland, Mich.; Masahiko Tamaki, Gotemba, Japan

[73] Assignee: The Dow Chemical Company, Midland, Mich.

[21] Appl. No.: 888,796

[22] Filed: Mar. 21, 1978

[51] Int. Cl.$^2$ ............................................. C08G 18/14
[52] U.S. Cl. .................................... 521/107; 252/182; 521/108; 528/49; 528/51; 528/85
[58] Field of Search ................ 252/182; 521/107, 108; 528/49, 51, 85

[56] References Cited

U.S. PATENT DOCUMENTS

| | | | |
|---|---|---|---|
| 3,738,953 | 6/1973 | Angora et al. | 521/123 |
| 3,773,696 | 11/1973 | Papa et al. | 521/126 |
| 3,789,091 | 1/1974 | Anderson et al. | 260/45.8 R |
| 3,933,693 | 1/1976 | Priest et al. | 521/127 |
| 4,052,346 | 10/1977 | Rudner et al. | 521/112 |

*Primary Examiner*—Maurice J. Welsh
*Attorney, Agent, or Firm*—James M. Kuszaj; Charles J. Enright

[57] ABSTRACT

Liquid flame-retardants for polyurethane compositions are disclosed. The liquid flame-retardants contain a mixture of a bromohydrin of pentaerythritol, a polyhydric alcohol, and a sufficient amount of a flame-retardant organo-phosphorus compound to render the mixture a substantially solids-free liquid at 25° C., one atmosphere pressure. Illustrative of these flame-retardants is a solution of 2,2-bis(bromomethyl)-1,3-propanediol, a cyclic phosphonate ester of the formula

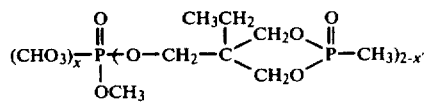

where x=0 or 1, and a poly(oxypropylene) adduct of glycerol having an average molecular weight of about 300.

13 Claims, No Drawings

FLAME RETARDANT COMPOSITION FOR POLYURETHANE COMPRISING BROMOHYDRIN OF PENTAERYTHRITOL AND AN ORGANOPHOSPHORUS COMPOUND

BACKGROUND OF THE INVENTION

The invention relates generally to flame-retardants for polymeric compositions. More particularly, it relates to liquid flame-retardants for urethane polymers (polyurethanes).

Polyurethanes are organic polymers containing repeated urethane linkages ($R_1$NHCOO$R_2$). The most common commercial method of forming these polymers is by the reaction of polyfunctional hydroxy compounds with polyfunctional isocyanates. The structure of a polyurethane derived from a dihydroxy compound OH—R—OH and a diisocyanate is given by

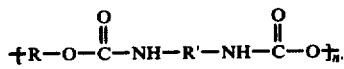

Cellular polyurethanes with properties ranging from rigid to flexible foam products are normally prepared from diisocyanates and hydroxyl-terminated polyether polyols or polyester polyols. Linear or only slightly branched polyols are used to provide flexible foams, whereas more highly branched polyols produce rigid foams. Foaming may be accomplished by including water in the system, the reaction between isocyanate and water providing carbon dioxide for foaming. Alternatively, foaming may be accomplished by including in the system a low-boiling liquid such as trichlorofluoromethane as a blowing agent. Appropriate catalysts and stabilizers control the foam formation and cure. A more detailed description of chemistry and technology of urethane polymers can be found in *Kirk-Othmer, Encyclopedia of Chemical Technology*, 2d edition, volume 21, pp. 56–106, Interscience Publishers, (1970); *Encyclopedia of Polymer Science and Technology*, volume 5, pp. 445–479, Interscience Publishers, (1971); both of which are herein incorporated by reference.

Polyurethane foams have excellent strength, durability, low density, light color, uniform cell size, and good heat insulating properties. Unfortunately, the foams have little inherent resistance to burning. In view of the extensive commercial use of polyurethane foams in the fields of insulation, structural reinforcement, cushioning, upholstery, electrical encapsulation, and the like, there has been an extensive effort in the polyurethane industry to produce a flame-retardant foamed product. Consequently, many organic and inorganic compounds have been employed as flame-retardants. However, none of these compounds has proved to be entirely satisfactory for this purpose.

One class of flame-retardants which has been incorporated into rigid and flexible polyurethane foams has been nonreactive organo-phosphorus compounds. Examples of such compounds include the cyclic phosphonate esters described in U.S. Pat. Nos. 3,789,091 and 3,849,368, the halogenated phosphonate-phosphite compounds described in U.S. Pat. No. 3,014,956; and the well-known tris-(2,3-dibromopropyl)phosphate. Such organo-phosphorus compounds have occasionally had a deleterious effect upon the physical properties of the foamed polyurethane product, e.g. moderate to severe foam discoloration. Moreover, some flame-retardant organo-phosphorus compounds possess undesirable toxicity problems. Other compounds, such as the cyclic phosphonate esters, have very high viscosity which render them difficult to use in standard foam-dispensing equipment due to pumping and mixing problems.

Another class of flame-retardants used in polyurethane foams has been inorganic and organic halogen-containing compounds. These compounds have included the bromohydrins of pentaerythritol such as, for example, 2,2-bis(bromomethyl)-1,3-propanediol, commonly known as dibromoneopentyl glycol ("DBNPG"), 3-bromo-2,2-bis(bromomethyl) propanol, commonly known as tribromoneopentyl alcohol ("TBNPA"), 2-bromomethyl, 2-hydroxymethyl, 1,3,-propanediol, and mixtures thereof. The use of both DBNPG and TBNPA as flame-retardant additives in rigid and flexible polyurethane foams is described in U.S. Pat. Nos. 3,738,953; 3,773,696; 3,933,693; and 4,052,346.

The use of the bromohydrins of pentaerythritol as flame-retardants for polyurethane foams has many inherent advantages over the use of other flame-retardants. First, the bromohydrins of pentaerythritol have excellent resistance to degradation by the urethane catalyst. Second, the bromohydrins of pentaerythritol enter into the polymerization reaction and become bound as part of the polymer matrix. Thus, they are not readily removed from the foam by volatilization, leaching, or migration. Third, the bromohydrins of pentaerythritol supply flame-retardancy to polyurethane foams without adding significantly to the smoke level. Fourth, the bromohydrins of pentaerythritol are compatible with the various other components generally employed in the production of polyurethane foams. Finally, the polyurethane foams containing the bromohyrins of pentaerythritol are generally resistant to discoloration or scorching and have excellent physical and mechanical properties.

However, one of the major drawbacks to the use of the bromohydrins of pentaerythritol is that both DBNPG and TBNPA are relatively high melting solids (melting at 109°–110° C. and 68°–69° C., respectively). Consequently, DBNPG and TBNPA may undergo some decomposition at temperatures above their melting point if not held under the proper conditions. Because of this, they are usually handled in a powdered or flake form. This severely limits the processing of these compounds in standard foam-dispensing equipment because of the difficulty of keeping the compounds homogeneously suspended in the foam component without excessively increasing the viscosity of the resinous ingredients. Very high viscosity renders most commercial foam formulations impossible to use in practice due to pumping and mixing problems.

U.S. Pat. Nos. 3,933,693 and 4,052,346 suggested a method of alleviating the solids problem by dissolving or dispersing DBNPG or TBNPA in the polyfunctional hydroxy compound used in the urethane polymerization reaction. However, this procedure is undesirable because the solubility of DBNPG and TBNPA in most polyfunctional hydroxy compounds is so extremely limited that excessive amounts of the polyfunctional hydroxy compounds need be employed in order to introduce flame-retardant amounts of the DBNPG or TBNPA into the polyurethane foam. (For example, U.S. Pat. No. 3,933,693 teaches that DBNPG has a maximum solubility of only about 15 percent by weight in a polyether polyols such as Multranol ® 7100 or 3900). Moreover, the polyfunctional hydroxy compounds most suited as liquid carriers and/or solvents for DBNPG and TBNPA oftentimes are not the most desirable polyfunctional hydroxy compounds for the urethane polymerization reaction.

U.S. Pat. Nos. 3,789,091 and 4,052,346 suggested blending conventional flame-retardants such as the cyclic phosphonate esters and a flame-retardant having free —$CH_2OH$ or $CH_2CH_2OH$ groups to produce a synergistic flame-retardant for polyurethane foams. However, it has not heretofore been generally desirable in the polyurethane foam industry to employ such a blend for although the flame-retardancy of the blend may be synergistically enhanced, the physical form of each of the materials, e.g. a solid or extremely viscous liquid, poses difficult material handling problems. Consequently, the blended material would seemingly not offer any of the formulating advantages of normal low viscosity liquid flame-retardants.

It would therefore be desirable to provide a flame-retardant which has not only a high concentration of the desirable bromohydrins of pentaerythritols, but which also offers the formulating advantages of being a low viscosity liquid at ambient temperature and of being compatible with the various other components generally employed in the production of polyurethane foams.

SUMMARY OF THE INVENTION

It has now been found that when the bromohydrins of pentaerythritol, flame-retardant organo-phosphorus compounds, and polyhydric alcohols are blended together in particular proportions, that a low viscosity liquid flame-retardant having an unexpectedly high concentration of the bromohydrin component results. This flame-retardant agent is a substantially solids-free liquid at 25° C., one atmosphere pressure, and is thus easily handled in a conventional polyurethane foaming apparatus.

The flame-retardant of the present invention comprise a mixture of at least about 46 percent by weight of a bromohydrin of pentaerythritol, from about 5 to about 45 percent by weight of a polyhydric alcohol, and a sufficient amount of a flame-retardant organo-phosphorus compound, to render said mixture a substantially solids-free liquid at 25° C., one atmosphere pressure. Also within the scope of this invention is a polyurethane composition comprising the reaction product of at least one polyfunctional isocyanate, one or more polyfunctional hydroxy compounds, and a flame-retardant amount of the above described flame-retardant.

The novel flame-retardants of the present invention offer numerous advantages over other flame-retardants used in polyurethane foams. First, at ambient temperatures the flame-retardants are liquids more concentrated in the desired bromohydrin component than was previously thought possible. Second, the flame-retardants have a viscosity at ambient temperature that is lower than the viscosity of the bromohydrin component or the organo-phosphorus component alone. Third, the flame-retardants achieve the same level of flame-retardancy in the polyurethanes with lower concentrations of the bromohydrin component but without significantly affecting the physical property of the foam. Finally, the flame-retardants provide a high ratio of the bromohydrin component to polyhydric alcohol component. This latter feature allows the polyurethane foam formulator flexibility to optimize the concentration of the polyfunctional hydroxy compound to meet the requirement of the foam. The necessity of maintaining a concentration of the polyfunctional hydroxy compound which is suitable both for the polymerization reaction and for solublizing bromohydrin component required to achieve flame-retardancy in the foam is minimized.

DETAILED DESCRIPTION OF THE INVENTION

The flame-retardants of the present invention can be formulated in one embodiment by heating the bromohydrins of pentaerythritol to a sufficient temperature to liquefy the material without decomposing it. For example, when DBNPG is the bromohydrin component, it is heated to a temperature of about 110° C. The resulting hot liquid is mixed with the polyhydric alcohol component and the organo-phosphorus component. The mixture is heated at a temperature from about 70° to about 120° C. for a period of from about 1 to about 3 hours. The order of addition of the polyhydric alcohol component and the organo-phosphorus component is not critical to the practice of the instant invention and may be reversed if desired.

In another embodiment, the polyhydric alcohol component is heated to about 70° C., and the bromohydrins of pentaerythritol are added as solid flakes. The resulting material is mixed with the organo-phosphorus component, and the mixture is heated as described above.

Organo-phosphorus compounds suitable for use are those that are liquid at 25° C. and function as flame-retardants in polyurethane foam compositions. Examples of such organo-phosphorus compounds include tris(2,3-dibromopropyl) phosphate, tris(2,3-dichloropropyl) phosphate, dimethyl methylphosphate, tris(β-chloroethyl) phosphate, triethyl phosphate, triphenyl phosphate, tris(β-chloropropyl) phosphate, tetrakis(2-chloroethyl)ethylene diphosphate, diethyl [bis(2-hydroxyethyl)amino]methane phosphonate, compounds of the formula:

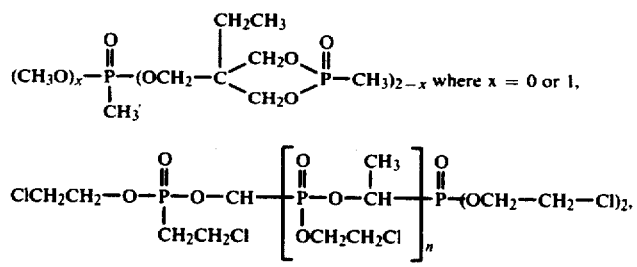

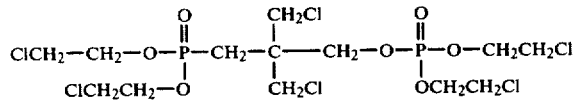

where n is a positive integer, mixtures thereof, and the like. The preferred organo-phosphorus compounds are of the formula:

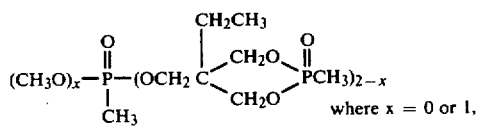

where x = 0 or 1.

The generic names for these preferred compounds are: where x=0, Bis[(5-ethyl-2-methyl-1,3,2-dioxaphosphorinan-5-yl)methyl] methanephosphonate P-oxide; and where x=1 (5-ethyl-2-methyl-1,3,2-dioxaphosphorinan-5-yl)methyl methyl methanephosphonate P-oxide. The preparation of the preferred compounds is described in detail in U.S. Pat. No. 3,789,091.

The bromohydrins of pentaerythritol which are suitable for use are 2-bromomethyl-2-hydroxymethyl, 1,3-propanediol, 2,2-bis(bromomethyl)-1-3-propanediol, (DBNPG), 3-bromo-2,2-bis(bromomethyl)propanol, (TBNPA) and mixtures thereof. The preferred bromohydrins is DBNPG. Standard commercial technical grades of DBNPG may also be readily employed, if desired. The typical composition of such technical grade DBNPG is about 80-82 percent by weight dibromoneopentyl glycol, from about 5 to about 7 percent by weight monobromoneopentyl triol, and from about 13 to about 15 percent by weight tribromoneopentyl alcohol. The brominated pentaerythritols can be prepared by the process described in U.S. Pat. No. 3,932,541.

Polyhydric alcohols suitable for use in the present invention are organic compounds which contain from about 2 to about 8 hydroxy groups per molecule, have a molecular weight from about 200 to about 5000, and at least partially solubilize the bromohydrins of pentaerythritol. Illustrative examples of such polyhydric alcohols include, triols, hexols, octols, alkanol amines, polyalkanol amines, polyester polyols, and polyester polyols, such as poly(oxypropylene) glycols, poly(oxypropylene) adducts of glycerol, poly(oxypropylene) adducts of trimethylolpropane, poly(oxypropylene-b-oxyethylene) adducts of trimethylolpropane, poly(oxypropylene) adducts of 1,2,6-hexanetriol, poly(oxypropylene) adducts of glycerine, poly(oxypropylene) adducts of sucrose, poly(oxypropylene-b-oxyethylene) adducts of ethylene diamine, poly(oxypropylene) adducts of sorbitol, poly(oxypropylene) adducts of alkanol amines, poly(oxyethylene) adducts of the above, mixture thereof, and the like. The preferred polyhydric alcohols are poly(oxypropylene) adducts of glycerol.

The flame-retardant is formulated to contain a mixture of at least about 46 percent by weight of the bromohydrins of pentaerythritol, from about 5 to about 45 percent by weight of the polyhydric alcohol, and a sufficient amount of the flame-retardant organo-phosphorous compound to render the mixture a substantially solids-free liquid at 25° C., one atmosphere pressure. In one embodiment, the flame-retardant comprises a mixture of from about 46 to about 65 percent by weight of a bromohydrin of pentaerythritol, from about 5 to about 45 percent by weight of a polyhydric alcohol, and from about 10 to about 49 percent by weight of a flame-retardant organo-phosphorus compound. In another embodiment, the flame-retardant comprises a mixture of from about 46 to about 55 percent by weight of a bromohydrin of pentaerythritol, from about 5 to about 45 percent by weight of a polyhydric alcohol, and from about 10 to about 49 percent by weight of a flame-retardant organo-phosphorus compound.

The maximum amount of the bromohydrin of pentaerythritol solubilized in the mixture will be dependent upon the particular organo-phosphorous compound employed. For example, when the flame-retardant organo-phosphorus is a compound of the formula:

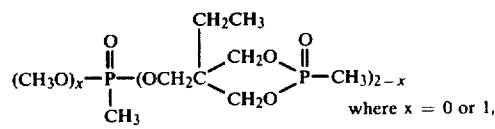

where x = 0 or 1, from about 46 to about 55 percent by weight of the liquid flame-retardant mixture is solubilized bromohydrins of pentaerythritol, from about 35 to about 43 percent by weight is the polyhydric alcohol (a poly(oxypropylene) adduct of glycerol), and from about 12 to about 16 percent by weight is the organo-phosphorus compound. When the flame-retardant organo-phosphorus compound is a compound such as dimethyl methylphosphate, from about 46 to about 65 percent by weight of the liquid flame-retardant is solubilized bromohydrins of pentaerythritol, from about 10 to about 20 percent by weight is the polyhydric alcohol, and from about 25 to about 30 percent by weight is the organo-phosphorus compound. The maximum amount of the bromohydrins of pentaerythritol which can be solubilized in any particular flame-retardant organo-phosphorus compound can easily be determined by mixing predetermined amounts of the particular organo-phosphorus component, the polyhydric alcohol component, and the bromohydrin component, and noting the precipitation of solid material at 25° C., one atmosphere pressure.

The flame-retardant mixtures of the present invention are substantially solids-free liquids having a viscosity at 25° C. of from about 100 to about 10,000 centipoise, depending upon the particular polyhydric alcohol, and organo-phosphorus component employed. In marked contrast, both DBNPG and TBNPA are solids at 25° C., and some flame-retardant organo-phosphorus compounds have viscosities in the order of 250,000 centipoise at 25° C.

Flame-retardant urethane polymers, particularly rigid cellular foams, are produced by reacting at least one polyfunctional isocyanate, and one or more polyfunctional hydroxy compounds, and a flame-retardant amount of the liquid flame-retardants described above.

The urethane polymerization reaction can be conducted by any known process. For example, any of the three principal reaction methods: (a) prepolymer; (b) semi- or quasi-prepolymer; and (c) one-shot can be employed. In the "one shot" procedure, the polyfunctional hydroxy compound, the polyfunctional isocyanate, the flame-retardant, and other components (i.e. catalyst, blowing and surfactant agents) are mixed simultaneously. In the prepolymer method, the polyfunctional hydroxy compound is mixed with an excess of the polyfunctional isocyanate before the flame-retardant and other components are added. In the semi- or quasi-prepolymer method, the polyfunctional isocyanate is reacted with a portion of the polyfunctional hydroxy compound, producing a low molecular weight polymer of low viscosity. This semi-polymer is then reacted with the remainder of the polyfunctional hydroxy compound, the flame-retardant, and other components. Each of the principal methods of reaction is improved when the flame-retardant utilized is in the form of the concentrated solution described above, as opposed to a powder, dispersion, or dilute solution because the number of liquid streams to be controlled or the volume of each stream is significantly reduced.

The amount of flame-retardant which is incorporated into any particular polyurethane reaction mixture depends on several factors including the degree of flame-retardancy desired, whether an additional flame-retardant is employed, the chemical composition of the polyurethane material, the physical nature (i.e. cellular or non-cellular), the density and with respect to cellular polymers the nature of the cellular structure (i.e. flexible, semi-flexible or rigid). In providing flame-retarded cellular rigid polyurethane foams, the present flame-retardants are employed in amounts sufficient to provide from about 1 to about 15 percent by weight of each of the flame-retardant components, i.e. the bromohydrin component and the organo-phosphorus component, in the resultant foamed product. Preferably, the present flame-retardants are employed in amounts sufficient to furnish from about 1 to about 10 weight percent of each of the bromohydrin component and the organo-phosphorus component in the resultant foamed product. Larger weight percentages of each flame-retardant component can be used as desired. However, the percentages indicated above have been found to be sufficient to modify the combustibility of the polyurethane to a level where the flame spread of the polyurethane foam is less than 25 when measured by the American Society for Testing Materials E-84 "Surface Burning Characteristics of Building Materials" test (ASTM E-84). It is recognized, however, that all known organic polymers will burn when subjected to a sufficiently intense heat source. Thus, terms such as "flame-retardants" and "flame spread rating" are not intended to indicate performance under actual fire conditions.

As indicated above, the polyurethane compositions are made by reacting at least one polyfunctional isocyanate with one or more polyfunctional hydroxy compounds. Representative examples of polyfunctional isocyanates that can be used to make the polyurethane compositions include: 2,4-tolylene diisocyanate, 2,6-tolylene diisocyanate, phenylene diisocyanates, ethylene diisocyanate, 1,7-naphthylene diisocyanate, 1,5-naphthylene diisocyanate, 4,4'-diphenylmethane diisocyanate, 4,4'-diphenyl diisocyanate, methylene diisocyanate, trimethylene diisocyanate, tetramethylene-1,4-diisocyanate, 1,4-butylene diisocyanate, 2,3-butylene diisocyanate, 1,4-cyclohexylene diisocyanate, 1,3-cylopentylene diisocyanate, cyclohexylene-1,2-diisocyanate, methylene bis(4-phenylisocyanate), diphenyl-3,3'dimethyl-4,7-diisocyanate, xylylene diisocyanate, cyclohexane-1,7 diisocyanate, 1-methoxyphenyl-2,4-diisocyanate, 1,2,4-benzene triisocyanate, polymethylene polyphenylisocyanate, tolyene-2,4,6-triisocyanate, 4,7'-dimethyldiphenyl methane-2,2',5,5'-tetraisocyanate, 7,4'-biphenylene diisocyanate, triphenylmethane-7,4'4''-triisocyanate, cumylene 2,4-diisocyanate, durylene diisocyanate, 2,4-diphenylhexane-1,6-diisocyanate, 2-chlorotrimethlylene diisocyanate, diphenyl-2,4,4-triisocyanate, dodecane-1,12-diisocyanate, cyclobutane-1,3-diisocyanate, hexahydrotolyene-2,4-diisocyanate, 1-methyl-2,4 diisocyanatocyclohexane, mixtures and polymers thereof, and the like.

The aromatic diisocyanates are generally the least expensive and most reactive polyisocyanates available, and are therefore preferred. For certain purposes, however, aralkyl polyisocyanates, such as the polymethylene polyphenyl diisocyanates, have valuable properties which make it desirable to use them alone or in mixtures with the aromatic diisocyanates.

Suitable polyhydric alcohols for use in the manufacture of polyurethanes include glycols, triols, hexols, octols, polyester polyols, and polyether polyols. Illustrative of such compounds are the alkylene oxide adducts of water or any of the following polyhydroxy-containing organic compounds: ethylene glycol, diethylene glycol, propylene glycol, dipropylene glycol, trimethylene glycol, butylene glycols, glycerine, 1,2,6-hexanetriol, 1,1,1-methyolethane, 1,1,1-trimethyolpropane, 3-(2-hydroxyethoxy)-1,2-propanediol, pentaerythritol, 1,2-cyclohexanediol, fructose, sorbitol, sucrose, lactose, glycosides, resorcinol, pyrogallol, phloroglucinol, di-, tri- and tetra-phenylol, alkanol amines, and the like.

A catalyst for the reaction between the polyisocyanate and the polyfunctional hydroxy compound can be used when making urethane polymers and is usually desirable when cellular foam is produced. Representative examples of suitable catalysts are triethylenediamine, dibutyltin dilaurate, triethylamine, N,N-dimethylcyclohexylamine, cobalt naphthenate, stannous octoate, and the like.

If desired, blowing agents, cell-size control agents, synergists such as antimony oxide, fillers, pigments, emulsifiers, water, surfactants, inhibitors against discoloration and aging, and other additives can also be added to the urethane reaction mixture.

The polyurethane polymeric compositions produced can be made into useful articles by conventional molding, casting, coating, and laminating techniques, all of which are well known in the art.

The invention is further illustrated by the following examples.

EXAMPLES

EXAMPLE 1—Formulation of Flame-Retardant

About 75 milliliters (ml) of a poly(oxypropylene) adduct of glycerol having a molecular weight of about 300 were introduced into a mixing vessel and heated to a temperature of about 70° C. About 90 grams (g) (0.34 mole) of a solid mixture of the bromohydrins of pentaerythritol described below was blended into the liquid poly(oxypropylene) adduct with continual stirring. The bromohydrin mixture used contained from about 80 to about 82 percent by weight dibromoneopentyl glycol, from about 5 to about 7 percent by weight monobromoneopentyl triol, and from about 13 to about 15 percent by weight tribromoneopentyl alcohol.

About 27.2 grams of a cyclic phosphate ester having the formula:

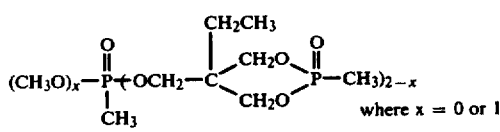

where x = 0 or 1 were introduced into the stirring solution of the poly(oxypropylene) adduct and the bromohydrin component. The resulting mixture was stirred and heated at 70° C. for about 2 hours.

The liquid mixture was then gradually cooled to about 25° C., and allowed to remain at that temperature for about 24 hours. The mixture was examined to determine whether any of the solid bromohydrin of pentaerythritol had precipitated upon cooling. The mixture was solids-free and had a viscosity at 25° C. of about 2000 centipoise.

The mixture was analyzed and found to contain about 45.5 percent by weight of the bromohydrins of pentaerythritol, about 40.9 percent by weight of the poly(oxypropylene) adduct, and about 13.6 percent by weight of the cyclic phosphate ester. (Table I, Example 1)

EXAMPLES 2-5

In a manner substantially as described in Example 1, the flame-retardant mixtures shown in Table I were prepared.

Comparative Runs A-L

Various flame-retardant mixtures containing proportions of the components outside the scope of the present invention were formulated substantially as described in Example 1. The resulting formulations are described in Table I.

TABLE I

| Example | Components (Percent by Weight) | | | Ratio of Component A/B | Solids-Free Solution at 25° C.* |
|---|---|---|---|---|---|
| | (A) Bromohydrins of Pentaerythritol | (B) Polyhydric Alcohol | (C) Organo-Phosphorous | | |
| 1 | 45.5 | 40.9 (a) | 13.6 (c) | 1.11 | Yes |
| 2 | 47.6 | 37.6 (a) | 14.8 (c) | 1.27 | Yes |
| 3 | 50.0 | 35.0 (a) | 15.0 (c) | 1.43 | Yes |
| 4 | 52.5 | 31.6 (a) | 15.9 (c) | 1.66 | Yes |
| 5 | 60.0 | 10.0 (b) | 30.0 (d) | 6.00 | Yes |
| Comparative Experiment A | 55.6 | 27.8 (a) | 16.6 (c) | 2.00 | No |
| Comparative Experiment B | 60.0 | 30.0 (b) | 10.0 (d) | 2.00 | No |
| Comparative Experiment C | 60.0 | 20.0 (b) | 20.0 (d) | 3.00 | No |
| Comparative Experiment D | 70.0 | 10.0 (b) | 20.0 (d) | 7.00 | No |
| Comparative Experiment E | 40.0 | 60.0 (a) | — | 0.67 | Yes |
| Comparative Experiment F | 40.0 | 60.0 (b) | — | 0.67 | Yes |
| Comparative Experiment G | 45.0 | 55.0 (a) | — | 0.82 | Yes |
| Comparative Experiment H | 45.0 | 55.0 (b) | — | 0.82 | Yes |
| Comparative Experiment I | 50.0 | 50.0 (a) | — | 1.00 | No |
| Comparative Experiment J | 50.0 | 50.0 (b) | — | 1.00 | No |
| Comparative Experiment K | 55.0 | 45.0 (a) | — | 1.22 | No |
| Comparative Experiment L | 55.0 | 45.0 (b) | — | 1.22 | No |

Notes:
*After standing 1 week to 2 weeks at room temperature.
(a) poly(oxypropylene) adduct of glycerol having a molecular weight of about 300.
(b) mixtures of poly(oxypropylene) adduct of sucroses, and glycerine having an equivalent weight of about 125.

(c) 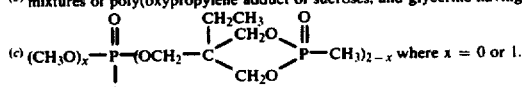 where x = 0 or 1.

(d) dimethyl methyl phosphate.

Comparative Experiments E, G, I and K indicate that in a two-component mixture of a bromohydrin of pentaerythritol and a particular polyhydric alcohol, the amount of the bromohydrin compound which can be solubilized to form a solids-free solution is limited to about 45 percent by weight. Examples 1-4 indicate that if an organo-phosphorus compound is added to the two-component system of Experiments E, G, I and K, that the solubility of the bromohydrin component increases to about 55 percent. Comparative Experiment A shows that the amount of the bromohydrin component which may be solubilized into a solids-free solution is limited even with the addition of the organo-phosphorus compound. Comparative Experiments F, H, J, and L show that in another two-component mixture of a bromohydrin of pentaerythritol and a particular polyhydric alcohol, the amount of the bromohydrin component which can be solubilized to form a solids-free solution is limited to about 45 percent by weight. Example 5 shows that the addition of an organo-phosphorus compound increases the solubility of the bromohydrin component to about 60 percent by weight. Comparative Experiments B, C, and D indicate that the amount of the bromohydrin component which may be solubilized into a solids-free solution is limited. A comparison of Examples 1–4 with Example 5 shows that the amount of the bromohydrin component which can be solubilized to form a solids-free solution varies with the particular organo-phosphorus compound employed.

EXAMPLE 6—Preparation of Flame-Retardant Polyurethane Resin Composition

Using the flame-retardant mixture of Example 3, a polyurethane foam was prepared by adding a polyfunctional isocyanate to a well stirred mixture of the flame-retardant and other urethane reaction components described in Table II. The total mixture was mechanically stirred for about 10 seconds, and then foams were prepared by use of an Admiral rigid foam machine. For comparative purposes, a similar foam was prepared but without the flame-retardant of Example 3. (Comparative Experiment M). The foams were cured and then the foam containing the flame-retardant was subjected to the American Society for Testing and Materials (ASTM) Test E-84 to determine flame spread rate. The physical properties of the polyurethane foams were measured by conventional methods. The physical properties of the foam and ASTM-E-84 test results are described in Table II.

TABLE II

Polyurethane Foam Formulation

| | Parts by Weight | |
|---|---|---|
| Component | Example 6 | Comparative Experiment M |
| Polyfunctional Polyhydroxy[a] | 100 | 100 |
| Flame-Retardant of Example 3 | 16.5 | — |
| Silicone Glycol Surfactant[b] | 1.2 | 1.5 |
| Amine Catalyst[c] | 3.0 | — |
| Tin-based Catalyst[d] | 0.3 | — |
| Amine Catalyst[e] | — | 1.8 |
| Trichlorofluoromethane[e] | 46.0 | 40.0 |
| Polyisocyanate[f] | 115 | 90.0 |
| Properties | | |
| Density (lb/ft$^3$) | 1.8 | 2.0 |
| Compressive Strength (psi) | 30.0 | 33.6 |
| Abrasion (% weight loss) | 1.1 | 6.6 |
| Volume Change (21 days) | 11.0% | 9.0% |
| Percentage Closed cells | >95% | >95% |
| ASTM E-84 Flame Spread | 75 | (h) |
| Smoke Density | 424 | (h) |

Footnotes
[a]VORANOL ®370, The Dow Chemical Company, Midland, Michigan
[b]Dow Corning 193, Dow Corning Corp., Midland, Michigan
[c]Polycat 8, Allbott Laboratories, Chicago, Illinois
[d]UL-8, Witco Chemical Company, New York, N.Y.
[e]Dabco 33LV an amine catalyst from Air Products and Chemicals, Inc., Allentown, Pennsylvania
[e]FREON 11B, E. I. DuPont de Nemours & Co., Wilmington, Del.
[f]Rubinate M, a polymethylene polyphenylisocyanate having an average functionality of about 2.6–2.8 and an NCO equivalent weight of about 134, Mobay Chemical Co., Pittsburgh, Pennsylvania
[h]based on additional tests, the flame spread rates are estimated at about 2000, and the smoke density at from about 300–400.

Table II indicates that polyurethane foam with excellent physical properties is prepared by use of the flame-retardant of the present invention.

What is claimed is:

1. A flame-retardant comprising a mixture of at least about 46 percent by weight of a bromohydrin of pentaerythritol, from about 5 to about 45 percent by weight of a polyhydric alcohol and a sufficient amount of a flame-retardant organo-phosphorus compound to render said mixture a substantially solids-free liquid at 25° C., one atmosphere pressure.

2. A flame-retardant of claim 1 comprising a mixture of from about 46 to about 65 percent by weight of a bromohydrin of pentaerythritol, from about 5 to about 45 percent by weight of a polyhydric alcohol, and from about 10 to about 49 percent by weight of a flame-retardant organo-phosphorus compound.

3. A flame-retardant of claim 1 comprising a mixture of from about 46 to about 55 percent by weight of a bromohydrin of pentaerythritol, from about 5 to about 45 percent by weight of a polyhydric alcohol, and from about 10 to about 49 percent by weight of a flame-retardant organo-phosphorus compound.

4. The flame-retardant of claim 1 wherein the bromohydrin of pentaerythritol is selected from the group consisting of 2-bromomethyl-2-hydroxymethyl-1,3-propanediol, 2,2-bis(bromomethyl)-1,3-propanediol, 3-bromo-2,2-bis(bromomethyl)propanol, and mixtures thereof.

5. The flame-retardant of claim 1 wherein the organo-phosphorus compound is selected from the group consisting of tris(2,3-dibromopropyl)phosphate, tris(2,3-dichloropropyl)phosphate, dimethyl methyl phosphonate, tris(β-chloroethyl)phosphate, triethyl phosphate, triphenyl phosphate, tris(β-chloropropyl)phosphate, tetrakis(2-chloroethyl)ethylene diphosphate, diethyl[bis(2-hydroxyethyl)amino] methane phosphonate, compounds of the formula:

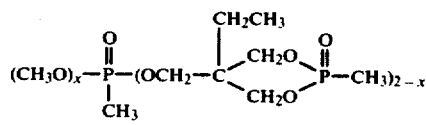

where x = 0 or 1,

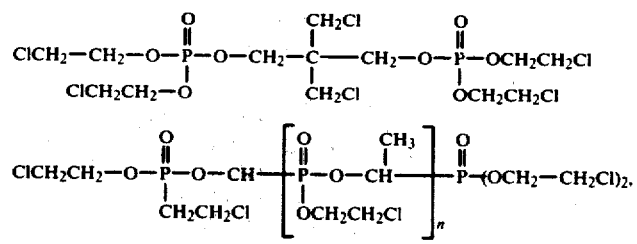

where n is a positive integer and mixtures thereof.

6. The flame-retardant of claim 1 wherein the polyhydric alcohol has from about 2 to about 8 hydroxy groups per molecule and has a molecular weight of from about 200 to about 5,000.

7. A flame-retardant of claim 1 comprising a mixture of from about 46 to about 55 percent by weight of a bromohydrin of pentaerythritol, from about 12 to about 16 percent by weight of a flame-retardant organo-phosphorus compound and from about 35 to about 43 percent by weight of a polyhydric alcohol.

8. In a process for producing flame-retardant polyurethanes by reacting at least one polyfunctional isocyanate, one or more polyfunctional hydroxy compounds, and a flame-retardant agent, the improvement comprising introducing the flame-retardant agent into the reaction in the form of a substantially solids-free liquid having the composition of claim 1.

9. A flame-retardant polyurethane composition comprising
(a) the reaction product of at least one polyfunctional organic isocyanate, one or more polyfunctional hydroxy compounds and,
(b) a flame-retardant amount of a flame-retardant of claim 1.

10. The composition of claim 9 containing from about 1 to about 15 percent by weight of each of the bromohydrin component and the organo-phosphorus component.

11. The composition of claim 9 wherein the polyurethane is a cellular foam.

12. The composition of claim 11 wherein polyurethane cellular foam is a rigid cellular foam.

13. A method of preparing a flame-retardant mixture comprising blending at least about 46 percent by weight of a bromohydrin of pentaerythritol with from about 5 to about 45 percent by weight of a polyhydric alcohol, and a sufficient amount of a flame-retardant organo-phosphorus compound to render said mixture a substantially solids-free liquid at 25° C., one atmosphere pressure.

* * * * *